Figure 1:
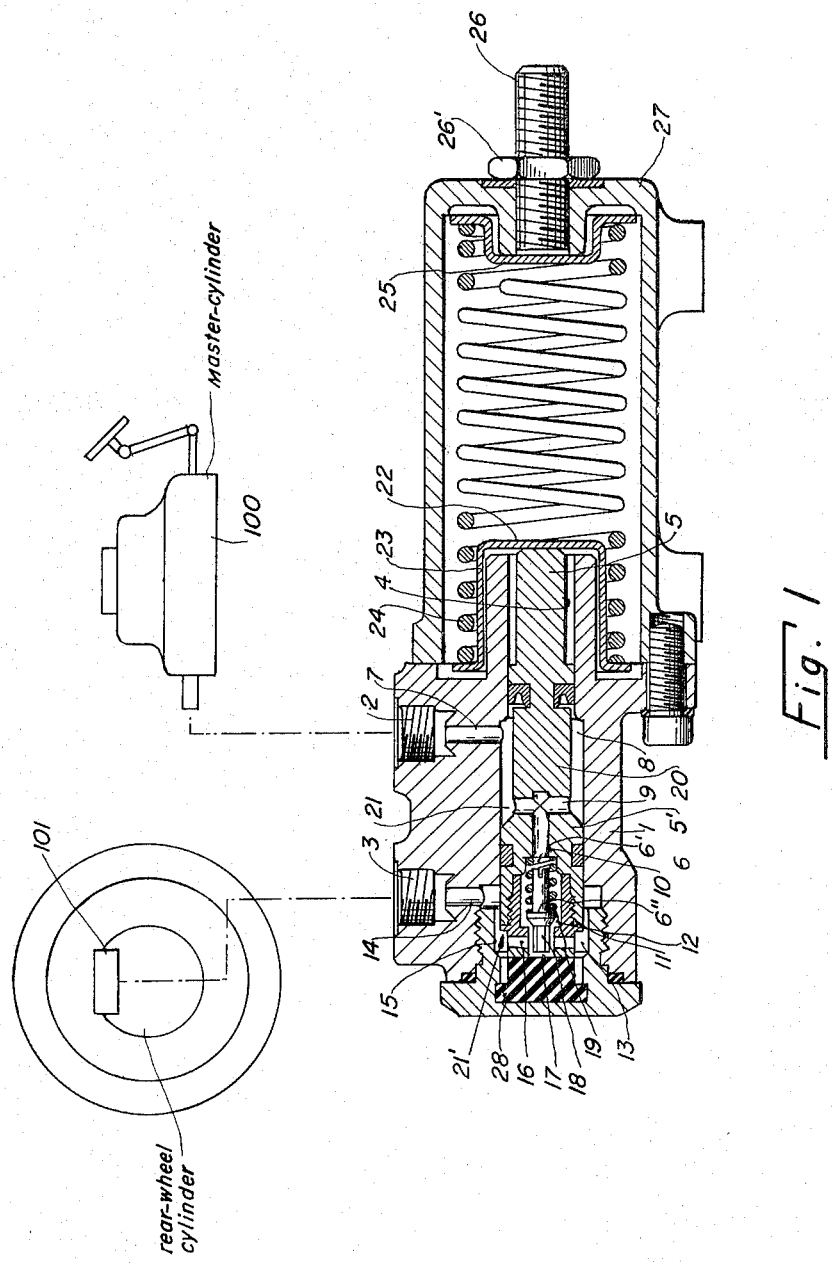

United States Patent Office 3,290,882
Patented Dec. 13, 1966

3,290,882
BRAKE-FORCE CONTROL VALVE AND SYSTEM
INCORPORATING SAME
Heinrich Oberthür, Offenbach-Rumpenheim, Germany, assignor to Alfred Teves, Maschinen- und Armaturenfabrik KG, Frankfurt am Main, Germany, a corporation of Germany
Filed Oct. 22, 1965, Ser. No. 501,856
Claims priority, application Germany, Dec. 8, 1964, T 27,571
5 Claims. (Cl. 60—54.5)

This application is a continuation-in-part of my copending application Ser. No. 426,038, filed Jan. 18, 1965, now Patent No. 3,233,947, as a continuation-in-part of application Ser. No. 217,609, filed Aug. 17, 1962 (now U.S. Patent No. 3,169,800 of Feb. 16, 1965).

My present invention relates to braking-force-reducing valves adapted to be incorporated in hydraulic-brake systems as well as to automative brake systems incoporating same. More particularly, this invention relates to improvements in the control valves illustrated and described in the aforementioned co-pending application Ser. No. 426,038, now Patent No. 3,233,947, and my above-identified patent.

As pointed out in the patent, it is generally desirable during actuation of an automotive vehicle brake to reduce the rate of increase of the braking force as applied, for example, to the rear-wheel brakes of the vehicle in order to preclude locking of the wheel brakes and skidding, and to provide greater control of the entire braking process. The patent describes a system whereby this control is afforded with the aid of a stepped or differentially operable piston whose larger effective surface is exposed to the hydraulic pressure at the wheel cylinders of the wheel brakes while the smaller effective surface is exposed to the pressure applied from the master cylinder of the brake system; a valve is provided in this stepped piston so that, during initial actuation of the master cylinder, hydraulic fluid is permitted to flow past the piston to the wheel brakes. Upon an increase in the braking force and the fluid pressure corresponding thereto, the hydraulic fluid in the braking-force regulator shifts the piston to close the valve whereby further pressure transmission from the master cylinder side of the regulator to the wheel-cylinder side thereof is effected by the force-transmitting piston. The ratio of the pressure increase on the master-cylinder side to the pressure increase on the wheel-cylinder side is thus inversely proportional to the ratio of the effective piston surfaces and, since the effective surface area on the wheel-cylinder side is greater, pressure increases at a slower rate on this side and the desired reduction in the rate of increase in the braking force is obtained. Upon release of the brake, the pressure fall characteristics of the system is similar to the pressure-increase characteristic beyond the switch-over point at which complete valve closure or valve opening occurs. In practice, however, it is found that a hysteresis loop is formed above the increasing-pressure characteristic which is disadvantageous from the point of view of control of the braking operation and for other reasons which will be apparent hereinafter.

It is, therefore, an important object of the present invention to provide a braking-force regulator of the general character described wherein the foregoing disadvantages can be avoided and which has a reduced "positive" hysteresis loop above the increasing-pressure characteristics of the systems.

Another object of this invention is to provide an improved brake system having a braking-force regulator adapted to afford better control of the braking operation than has been possible heretofore.

These objects and others which will become apparent below are attained, in accordance with the present invention, through the provision of a braking-force regulator having a stepped differentially operable piston and valve assembly as generally described in my patent No. 3,169,800 but which includes a yieldable abutment surface for the differential piston and for its valve whereby, prior to the switch-over point, the stepped piston is held against this elastically yieldable surface (preferably formed by an elastomeric cushion) so that the valve member is held by this surface in an "open" condition. I have found that this arrangement produces the desired effect in that both the increasing-pressure characteristic and the decreasing-pressure characteristic beyond the switch-over point are generally flat curves with a minimum hysteresis loop being formed. It will be understood that the elastomeric cushion can be composed of synthetic or natural rubber or a synthetic resin, with the cushion material being in each case resistant to attack on the hydraulic brake fluid. Thus, materials similar to those used in the elastomeric seals of the brake system can be employed.

According to a more specific feature of this invention, the resilient cushion is seated in a wall of the brake-regulator housing at an end of the bore in which the differential piston is displaceable but is surrounded by the housing with annular clearance to permit compression of the body with radical expansion unimpeded into this clearance. The body can have a conical cylindrical, spherical or hemispherical configuration or that of another body of revolution with the axis running in the direction of movement of the stepped piston.

Figure 2:
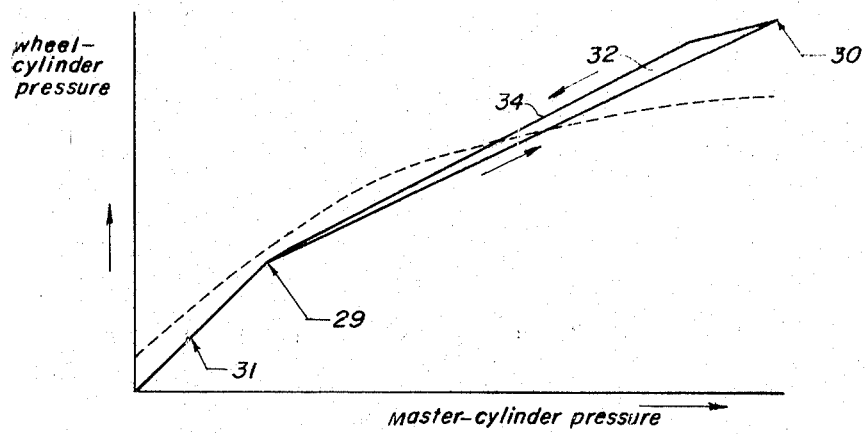
Figure 3:
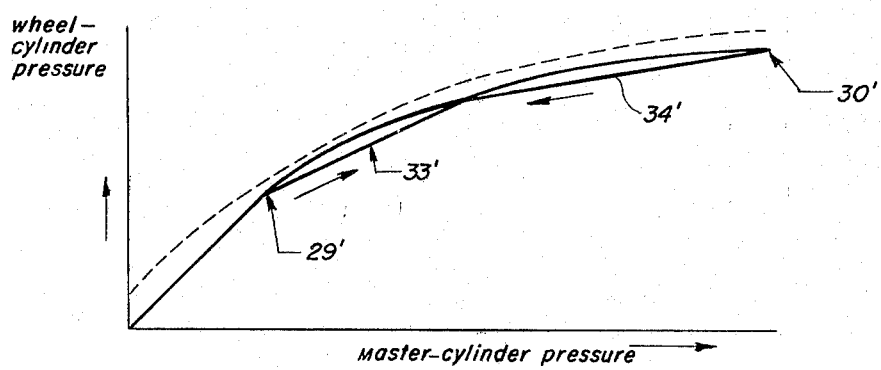

The above and other objects, features and advantages of the present invention will become more readily apparent from the following description, reference being made to the accompanying drawing, in which:

FIG. 1 is a longitudinal cross-sectional view through the pressure-reducing valve in accordance with the present invention;

FIG. 2 is a graph illustrating the relationship between the pressure delivered to the wheel cylinders, plotted as the ordinate, and the pressure applied by the brake master cylinder, plotted as the abscissa, of a brake system embodying the pressure-reducing valve of the last-mentioned copending application; and FIG. 3 is a graph of the pressure-reducing hysteresis characteristics of a brake system embodying the present improvement.

Referring first to FIG. 1, it will be seen that the pressure-reducing valve of the present invention, as described in the aforementioned copending application, comprises a housing 1, having a port 2, connected with the master cylinder 100 and axially spaced from this inlet port, an outlet port 3, connectable with the wheel-brake cylinders 101 of, for example, the rear wheels of an automotive vehicle. A stepped-diameter central bore 4 extends through the housing 1 and receives a differential piston of stepped configuration which is axially slidable in this bore. The piston is designated by the reference numeral 5 and is provided with a valve member 6 axially shiftable relatively to the piston and received within an axial passage 6' open toward the left-hand side of this piston. Hydraulic fluid from the master cylinder is delivered from the passage 7, communicating with the port 2, to the pressure chamber 8 on the right-hand side of the piston head 5' and thus tends to urge the piston 5 to the left as indicated in the figure. The piston 5 is provided with a transverse (i.e. radial) bore 9 which communicates with axial passage 10 in the piston head 5', the passage 10 communicating in turn with the valve chamber 6' defined in part by the piston 5 and in part by a valve housing 11 threaded into this piston from the left-hand side.

The housing 11 forms a valve seat 12 co-operating with a frustoconical portion 6" of the valve body 6 past which hydraulic fluid can flow, in an open condition of the valve member 6, into a further pressure chamber 13 defined between the piston 5 and the left-hand end of the housing 1. The chamber 13 communicates via a passage 14 with the outlet port 3. The left-hand end of the housing 1 is closed by a plug 15 threaded into the housing 1, and defining therein the chamber 13. The valve housing 11 is provided with transverse (i.e. radial) bores 16 which communicate between the valve passage 6' and the pressure chamber 13. The bores 16 remain unblocked even when the left-hand end of the piston 5 abuts, via the valve housing 11, the justaposed surface 17 of a rubber cushion body 28 seated in the plug 15. In this abutting position of the piston 5, the valve body 6 is held via a stud 18 at its left-hand extremity, which contacts the surface 17, against the force of a valve spring 19 in an "open" condition to permit hydraulic fluid to flow from the passage 7 through the chamber 8, the bores 9 and 10, the valve chamber 6', the valve seat 12, the bores 16, and the pressure chamber 13 to the passage 14 and outlet port 3 for deliver to the wheel cylinder 101. The stepped piston 5 has a small step 20 (by comparison with the head 5') so that the surface 21 is constantly under the pressure of hydraulic fluid from the master cylinder.

The right-hand end face 22 of this smaller step 20 of the piston 5 is engaged by a plate 23 against which a compression spring 24 is seated, the other end of this compression spring bearing against a further plate 25 which is axially adjustable within the spring housing 27 by a screw 26 provided with a locking nut 26'. By adjustment of this screw 26, 26', the spring 24 can be precompressed or prestressed to provide the desired restoring force for the piston 5.

Upon actuation of the brake pedal coupled with the master cylinder 100, hydraulic fluid is forced from the master cylinder through the port 2 and passage 7 through the force-reducing valve assembly to the wheel cylinders 101. During this initial operation of the device, the piston 5 is held by the spring 24 in abutting relationship with the compressible rubber cushion 28 so that the valve member 6 is held to the right (FIG. 1) against the force of spring 19 and the aforedescribed flow of hydraulic fluid is made possible. The rear-wheel brakes of the motor vehicle are thus applied in the usual manner.

As the brake pressure increases, however, a force differential is applied to the brake cylinder 5 since the left-hand end 21 of the head 5' of the piston is larger in effective surface area than the counteracting effective surface 21. Since the force applied to the piston on each side of the head 5' is the product of the pressure and the respective surface area, the force differential acts to displace the piston 5 to the right against the force of spring 24 which is adjustable, as previously mentioned, by the screw 26 and the spring plate 25. As a switch-over point in the pressure characteristic of the valve assembly determined by the adjustment of screw 26, is reached (corresponding to the point in the application of pressure by the master cylinder at which it is desired to reduce the pressure applied to the wheel cylinders), the force of spring 24 is exceeded so that the piston 5 is drawn to the right by an extent sufficient to bring the seat 12 into engagement with the frustoconcial valve portion 6" of the valve member 6. This valve 6 is thus closed and further pressure applied at the master cylinder is transmitted to the pressure chamber 13 only by the piston 5. Inasmuch as the pressure transmitted by the piston from one chamber to another is inversely proportional to the effective surface areas of the piston exposed to the fluid in each chamber, the pressure developed in chamber 13 is reduced in inverse relationship to the ratio of the effective surface area 21' to the effective surface area 21, by comparison with the pressure delivered at the inlet port 2; a similar inverse relationship exists for the rate of change of the pressure in the chambers 8 and 13.

In FIG. 2 I show a graph of the pressure characteristics embodying a valve similar to that shown in FIG. 1 but wherein the rubber cushion 28 is omitted and the piston 5 abuts against a rigid surface. In the graph of FIG. 2, the master-cylinder pressure is plotted along the ordinate. It will be understood that the curve also applies to the pressure as measured in the chambers 8 and 13 as well.

As can be seen from the graph, the pressure increase is substantially linear as indicated by the reference numeral 31 during the initial application of force to the brake pedal until the switch-over point 29 is reached. From the switch-over point 29 onward, the pressure increase remains substantially linear but has a reduced slope corresponding to the ratio of the effective surfaces of the piston as previously described. The terminal point of the pressure increase is indicated at 30 and when the brake pedal is released, the pressure decrease (reference numeral 34) is linear but of a slope differing from that of the pressure increase. At the switch-over point 29, corresponding to engagement of the valve member 6 with the abutment 17 (here considered to be fixed), the pressure again falls with a steeper slope (reference numeral 31) following the curve of the pressure increase up to the switch-over point. The hysteresis loop 32, which develops apparently as a consequence of the sudden movement of the piston 5 to the right upon the conclusion of the braking operation, is disadvantageous in that it involves a substantially spontaneous increase above the pressure during the corresponding application of braking force.

Through the use of the rubber cushion 28, a spontaneous movement of the piston 5 is avoided inasmuch as the cushion 28 is partially compressed when the piston 5 is in its extreme left-hand position. Thus, it will be seen by the reference to FIG. 3, that the pressure characteristic is substantially linear during the initial portion of the application of braking force (corresponding to the open position of valve 6 when the piston 5 abuts the yieldable surface 17) until the switch-over point 29' is attained. With continued application of the braking force, however, the pressure increase 33' has a substantially flatter slope to the terminal point 30' while the pressure decrease 34' has a similar but inversely symmetrical slope from the terminal point 30' to the switch-over point 29'. Thus upon reduction of the pressure applied to the brake cylinder, the hysteresis lost initially has a slightly negative value and only attains a small positive value upon movement of the piston 5 with the valve 6 away from the cushion 28. The sudden discontinuity characterizing systems having a rigid abutment for the piston 5 is avoided.

It will be understood that the invention as described and illustrated can be modified with respect to the structure shown without, however, deviating from the spirit and scope of the invention as set forth in the appended claims.

I claim:

1. A braking-force regulator adaptable for use in an automotive-vehicle hydraulic brake system having a master cylinder for generating braking pressure and at least one hydraulically actuatable wheel-brake cylinder, said regulator comprising:
   a housing having an axial bore;
   a differentially operable stepped piston received in said bore and axially shiftable therein while subdividing said bore into an inlet pressure chamber connectable with said master cylinder and an outlet pressure chamber connectable with said wheel-brake cylinder, said piston having a relatively large effective surface area exposed to fluid pressure in said inlet chamber and a relatively small effective surface area exposed to fluid pressure in said outlet chamber;

valve means in said piston for controlling the flow of hydraulic fluid between said chambers and including a valve member shiftable between open and closed positions upon movement of said piston;

elastically deformable cushion means in said housing engageable by said piston and forming a yieldable abutment therefor upon movement of said piston against the net hydraulic force applicable to same for holding said surface member in an open position while said piston abuts said cushion means; and restoring means acting upon said piston against the net hydraulic force applicable thereto for urging said piston against said cushion means.

2. A regulator as defined in claim 1 wherein said cushion means is a resilient body composed of an elastomeric material.

3. A brake regulator as defined in claim 2 wherein said housing surrounds said body with annular clearance.

4. A brake regulator as defined in claim 3 wherein said body has the configuration of a body of revolution with an axis extending substantially in the direction of displacement of said piston.

5. A brake regulator as defined in claim 1 wherein said valve member has a stud extending from an end of said stepped piston confronting said cushion means and is engageable therewith upon abutment of said piston with said cushion means, said valve means further including a spring urging said valve member into said closed position, said restoring means including a compression spring acting upon said stepped piston at its opposite end, and adjusting means for prestressing said compression spring.

References Cited by the Examiner

UNITED STATES PATENTS

| | | | |
|---|---|---|---|
| 3,169,800 | 2/1965 | Oberthür | 303—22 |
| 3,233,947 | 2/1966 | Oberthür | 303—22 |

MARTIN P. SCHWADRON, *Primary Examiner.*

ROBERT R. BUNEVICH, *Assistant Examiner.*